Patented Apr. 10, 1945

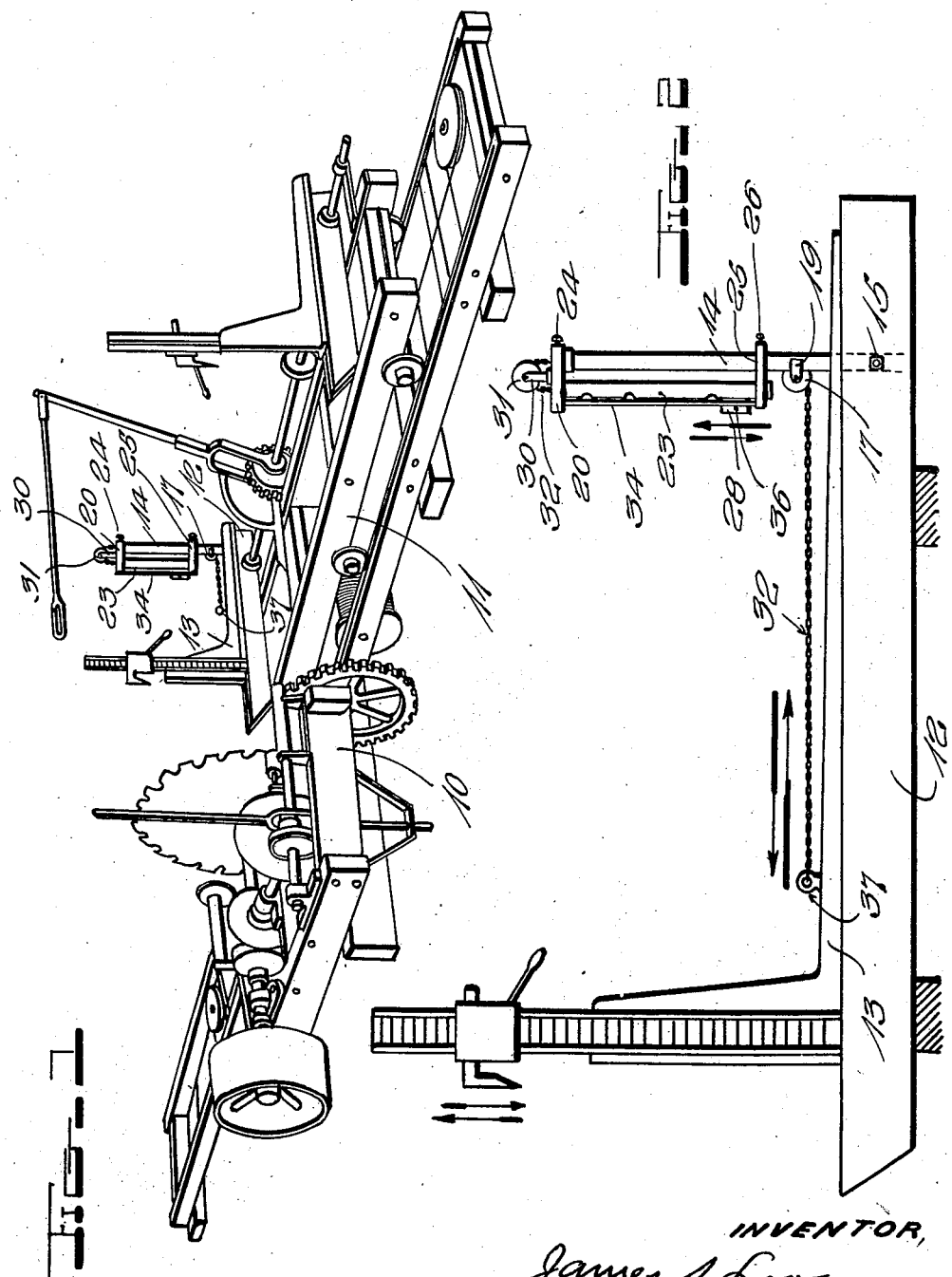

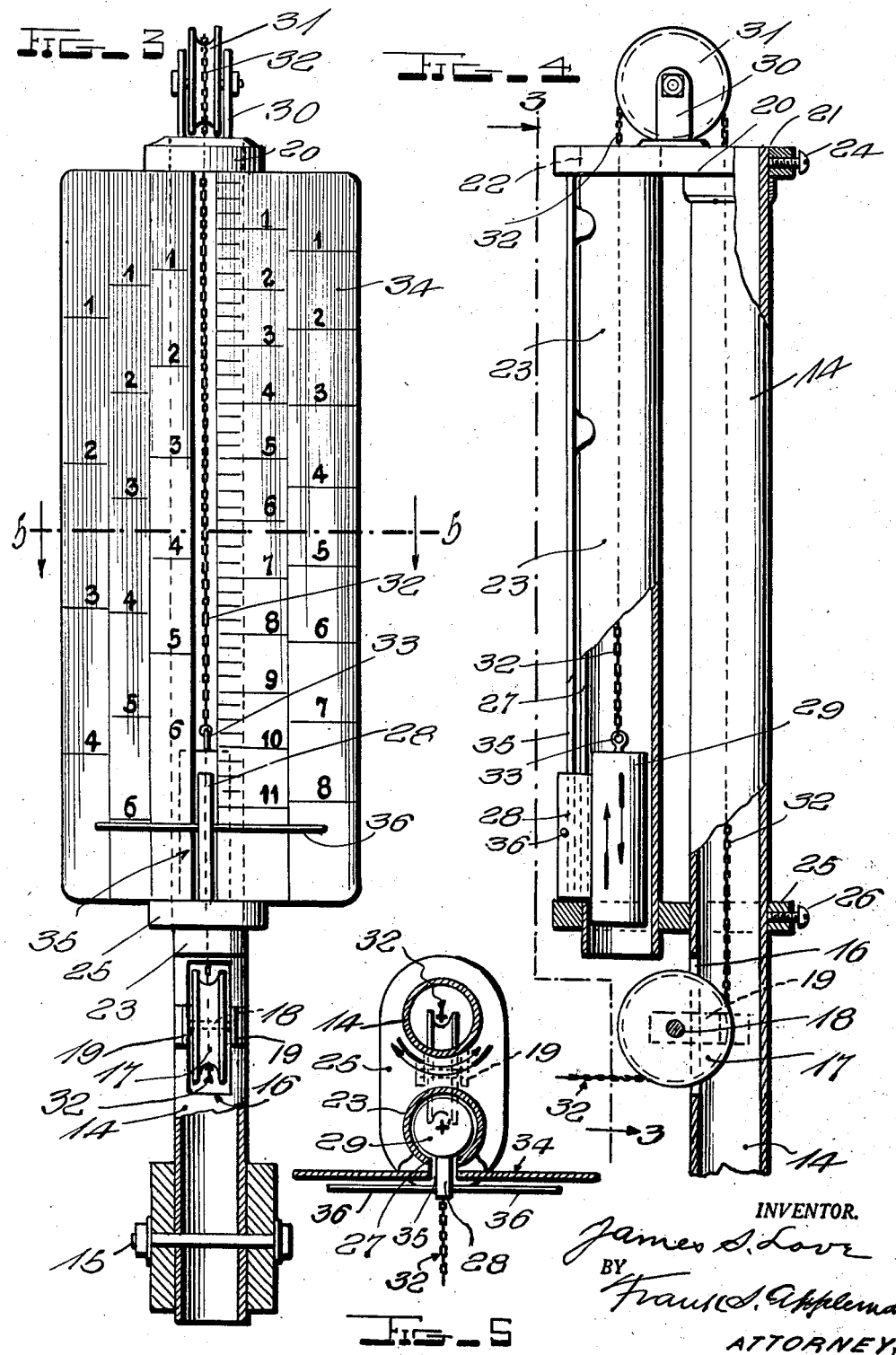

2,373,486

UNITED STATES PATENT OFFICE 2,373,486

SAWMILL GAUGE

James S. Love, Madison, Tenn.

Application July 11, 1944, Serial No. 544,403

1 Claim. (Cl. 143—124)

This invention relates to attachments for saw mills in which cuts which are diversified in thickness are effected, and it is an object of this invention to produce a gauge or indicator that establishes by reading, the degree of movement which is imparted to the head block, in order that the sawyer or operator may determine the thickness of the cut.

It is a further object of this invention to provide a gauge operated by the movement of a head block, the said gauge having graduations with relation to which a pointer or indicator is moved so that the thickness of the cut may be determined, and the gauge has a plurality of graduations suitable to produce cuts of the thickness of the various commercial lumber.

It is a still further object of this invention to provide a gauge of the character indicated which may be located on a stationary part of the saw mill, in operative relation to the knee, commonly a part of such saw mills, and having parts so assembled that an indicator is moved in front of the graduated scales when positioning the lumber to be cut with relation to the saw, for producing a certain thickness of the cut.

It is furthermore an object of the invention to provide means for adjustably mounting the gauge, whereby it may be moved to different positions in order that it may face the sawyer or operator of the mill.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 illustrates a view in perspective, showing parts of the saw mill with a gauge embodying the invention applied thereto;

Figure 2 illustrates a transverse sectional view, showing a base on which the gauge is anchored and the head block operative in conjunction therewith;

Figure 3 illustrates a sectional view on the line 3—3 of Fig. 4;

Figure 4 illustrates a view in side elevation of the gauge, partly in section; and Figure 5 illustrates a sectional view on the line 5—5 of Fig. 3.

In these drawings 10 indicates generally a mill saw and its accompanying parts, which may be of any appropriate construction and need not, it is thought, be described in detail. The log or lumber carrier 11 may likewise be of any appropriate construction, having a base 12 on which the head block 13 is slidable, and these parts may likewise be of any appropriate construction and are therefore not described in detail. The gauge or indicator comprises a hollow post 14 secured to the head block by an anchorage assembly 15 of any appropriate construction, and the said post has an opening 16 into which the periphery of a sheave pulley 17 projects and in which it is rotatably mounted on a shaft 18 carried by arms or brackets 19 secured on the post in appropriate manner. A plate 20 has apertures 21 and 22 to receive the post and a tube 23, respectively, and the said plate is adjustably secured on the post 14 by a set screw 24 so that the plate can be turned and held at different positions of adjustment.

The tube depends from the plate 20 and has its lower ends anchored in an aperture of a plate 25, which likewise has an aperture for the reception of the post, and the plate 25 is adjustably held on the post by a set screw 26. The depending tube has a slot 27 in which a fin or elongated flange 28 may slide, it being shown that the flange is carried by a weight 29 movable in the tube. A bracket 30 is mounted on the upper surface of the plate 20 and a sheave pulley 31 is rotatably mounted on the bracket. A chain or flexible member 32 operates over the sheave pulleys 31 and 17 upwardly and downwardly through the tube and upwardly and downwardly through the post, the said flexible member being connected to the weight, as at 33.

The gauge 34 is mounted on the tube and has a slot 35 corresponding to the slot in the tube in which the fin or flange is slidable, and an indicator or pointer 36 extends through the fin and projects over the face of the gauge on each side of the slot so that it may be brought into registry with any of the graduations on the face of the gauge and, as has been stated, these graduations indicate the width of the usual commercial lumber.

The flexible member 32 in the present showing extends over the head block and is anchored to it, as at 37, and as the head block is moved toward and away from the saw, the thickness of the cut is determined and indicated on the gauge, according to the position of the pointer 36.

As has been stated, the gauge may be moved to different positions around the post so that it may be in position to be conveniently consulted and read by the operator or sawyer.

I claim:

In a gauge for sawing machines, the combination with a head block, a hollow post stationary with relation to the head block and having an aperture near its lower end, a sheave pulley rotatably mounted in the said aperture, a plate having two apertures one of which receives the upper end of the post, a plate having apertures mounted on the said post in spaced relation to the first mentioned plate, a tube located in the apertures of the plates, means for holding the plates in different positions of adjustment, the post having a slot below the last mentioned plate, a sheave pulley mounted on the first mentioned plate, a flexible member having one end secured to the head block and threaded in engagement with the sheave pulleys through the hollow post and tube, a weight on the opposite end of the flexible member within the tube, a gauge supported in fixed relation to the tube, the said tube and gauge having coinciding apertures, a member carried by the weight projecting through the said slots, an indicator carried by the projection extending across the face of the gauge, and graduations on the said gauge, the indicia of which indicates thicknesses of commercial lumber.

JAMES S. LOVE.